United States Patent
Masuda

(10) Patent No.: US 10,212,652 B2
(45) Date of Patent: Feb. 19, 2019

(54) WIRELESS MODULE, INFORMATION PROCESSING APPARATUS, AND COMPUTER-READABLE RECORDING MEDIUM

(71) Applicant: FUJITSU LIMITED, Kawasaki-shi, Kanagawa (JP)

(72) Inventor: Yasuhiko Masuda, Kawasaki (JP)

(73) Assignee: Fujitsu Limited, Kawasaki-Shi, Kanagawa (JP)

(*) Notice: Subject to any disclaimer, the term of this patent is extended or adjusted under 35 U.S.C. 154(b) by 73 days.

(21) Appl. No.: 15/276,919

(22) Filed: Sep. 27, 2016

(65) Prior Publication Data

US 2017/0150433 A1 May 25, 2017

(30) Foreign Application Priority Data

Nov. 25, 2015 (JP) .................. 2015-230052

(51) Int. Cl.
*H04W 24/08* (2009.01)
*H04W 48/18* (2009.01)
*H04W 52/02* (2009.01)

(52) U.S. Cl.
CPC ........... *H04W 48/18* (2013.01); *H04W 24/08* (2013.01); *H04W 52/0229* (2013.01); *H04W 52/0274* (2013.01); *Y02D 70/00* (2018.01)

(58) Field of Classification Search
CPC ...................................... H04W 48/18
USPC ........................................... 370/352
See application file for complete search history.

(56) References Cited

U.S. PATENT DOCUMENTS

2013/0331046 A1 12/2013 Hawaka et al.
2015/0237183 A1* 8/2015 Novet ............... H04M 1/72569
455/556.1

FOREIGN PATENT DOCUMENTS

JP 2010-278558 12/2010
JP 2013-255156 12/2013

\* cited by examiner

*Primary Examiner* — Shirpal K Khajuria
(74) *Attorney, Agent, or Firm* — Osha Liang LLP

(57) ABSTRACT

A storage unit stores therein a DPC table that is used to limit the intensity of output radio waves of an information processing apparatus. When a wireless module is connected, a determination unit acquires specific identification information which is held by the wireless module and which is related to an specific information processing apparatus which is connected the last time and determines whether there is a match to identification information on the own apparatus. When the determination unit determines that there is no match, a writing unit allows the wireless module to perform wireless communication by using the DPC table stored in the storage unit.

9 Claims, 7 Drawing Sheets

FIG.4

| COMMUNICATION MODE | FREQUENCY (BAND) | DPC SET VALUE (dBm) |
|---|---|---|
| LTE | 1 | 0.0 |
| | 2 | 4.0 |
| | 3 | - |
| | 4 | 5.0 |
| | 5 | 3.0 |
| | ⋮ | ⋮ |
| WCDMA | 1 | - |
| | 2 | 4.0 |
| | 3 | - |
| | 4 | 5.0 |
| | 5 | 3.0 |
| | ⋮ | ⋮ |
| CDMA | 0 | 3.0 |
| | 1 | 4.0 |
| | 3 | - |
| | 4 | - |
| | 5 | - |
| | ⋮ | ⋮ |
| GSM | 850 | 5.0 |
| | 900 | 0.0 |
| | 1800 | 0.0 |
| | 1900 | 3.0 |

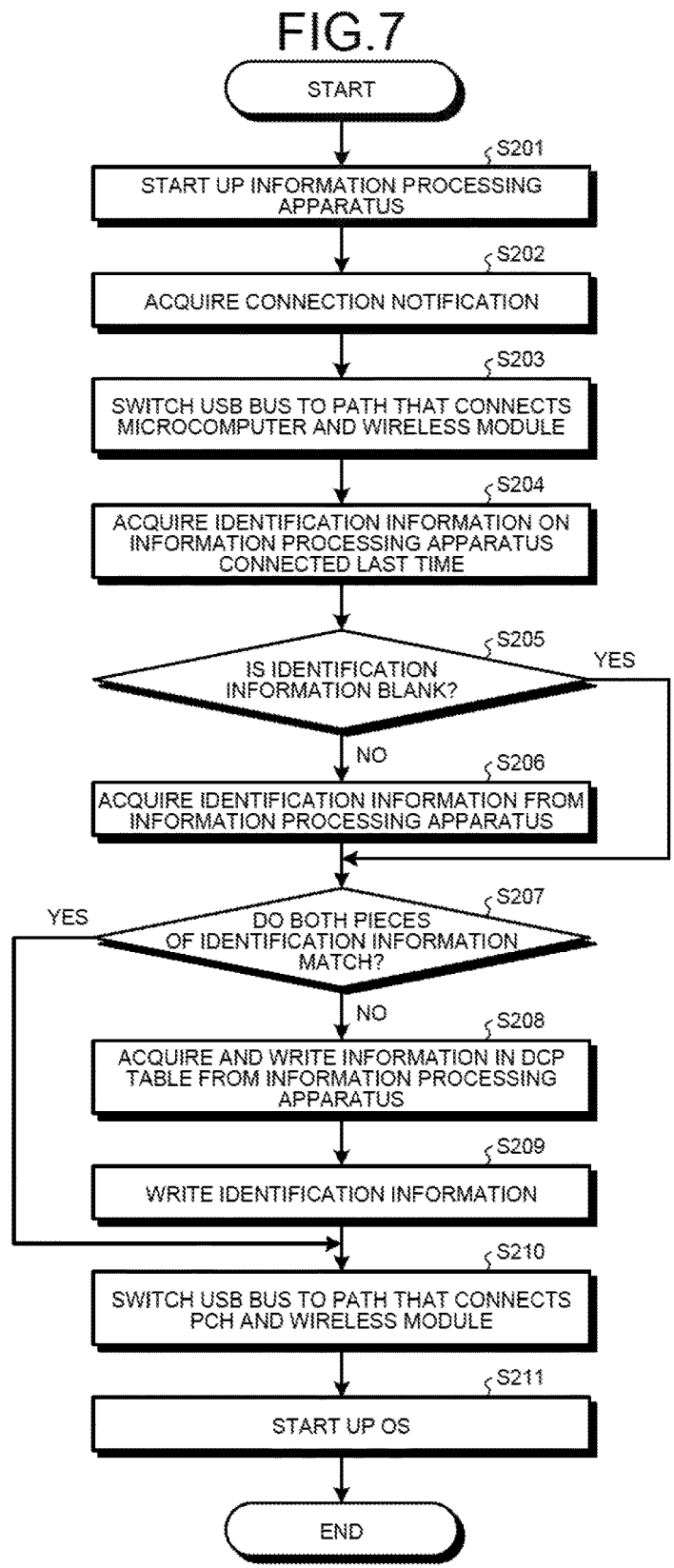

WIRELESS MODULE, INFORMATION PROCESSING APPARATUS, AND COMPUTER-READABLE RECORDING MEDIUM

CROSS-REFERENCE TO RELATED APPLICATION

This application is based upon and claims the benefit of priority of the prior Japanese Patent Application No. 2015-230052, filed on Nov. 25, 2015, the entire contents of which are incorporated herein by reference.

FIELD

The embodiments discussed herein are related to a wireless module, an information processing apparatus, and a computer-readable recording medium.

BACKGROUND

In recent years, wireless communication systems with various standards are introduced with the development of information communication devices, such as personal computers or the like, the use of radio waves is remarkably developed in terms of the quality and quantity. Thus, it is more important to improve the environment in which radio waves can be used at ease.

Therefore, the Body-Specific Absorption Rate (SAR) standard is proposed as the standards for limiting the intensity of radio waves emitted from a wireless apparatus to the range that does not affect the human body. In order to conform to the Body-SAR standard, in an information processing apparatus having mounted thereon a wireless module, such as a wireless world area network (WAN), or the like, the maximum send output of the wireless radio wave is reduced to a value that satisfies the Body-SAR standard when the human body approaches. In the control of the maximum send output in order to conform to the Body-SAR standard, because an amount of the send output to be reduced is adjusted and determined for each transmission frequency, the decreased amount of the send output differs for each type of devices. Specifically, the wireless module mounted on each of the information processing apparatuses has a table in which a set value that reduces the send output for each frequency is written. This table is sometimes referred to as a Dynamic Power Control (DPC) table. As described above, the set value that is written in the DPC table in the wireless module differs for each type of devices. Thus, currently, a dedicated DPC table is produced for each type of devices.

At this point, in general, wireless modules themselves are usually mounted on various kinds of information processing apparatuses. Thus, it is possible to mount and operate the wireless module that was mounted on a certain information processing apparatus on another information processing apparatus. However, if the wireless module is simply mounted and reused, this indicates that a DPC table that is used for the certain information processing apparatus is used for the other information processing apparatus; therefore, the send output may possibly exceed the Body-SAR standard.

Thus, in order to eliminate inconsistency in DPC tables, it is conceivable to produce wireless modules associated with the corresponding types of the produced DPC tables. Furthermore, when an information processing apparatus is produced, it is conceivable to write a DPC table associated with the corresponding apparatus into a wireless module mounted on the information processing apparatus. Furthermore, it is also conceivable to use a method of writing a DPC table into a wireless module by an operator using software after the OS has been started up. Furthermore, it is also conceivable to automatically write an associated DPC table into a wireless module by using an application when an information processing apparatus is installed.

Furthermore, there is a conventional technology that switches, for each country, on/off function for determining a country and automatically decreasing the SAR. Furthermore, there is a conventional technology that automatically changes, on the basis of prescribed items of the regulations accumulated in a server, the setting of output properties in accordance with the content prescribed in the latest Radio Law.

Patent Document 1: Japanese Laid-open Patent Publication No. 2013-255156

Patent Document 2: Japanese Laid-open Patent Publication No. 2010-278558

However, when producing each of the wireless modules associated with the corresponding types of DPC tables, a large number of modules used in different ways needs to be produced. Consequently, management becomes complicated as the number of devices is increased and thus the management cost may possibly be increased and, furthermore, a unit price of a module may possibly be increased. Furthermore, when a DPC table is written at the time of producing an information processing apparatus, if a wireless module is replaced after the shipment, there may be a case of forget to update the DPC table. In such a case, the wireless module does not conform to the SAR standard and may possibly violate the Radio Law. Furthermore, in the method of writing the DPC table into the wireless module by the operator using the software, if the operator forgets to write the DPC table by using the software, the wireless module does not conform to the SAR standard and may possibly violate the Radio Law. Furthermore, in the method of automatically writing the DPC table when the information processing apparatus is installed, if an image stored in a hard disk at the shipment is changed, because automatic writing is not performed, the wireless module does not conform to the SAR standard and may possibly violate the Radio Law.

Furthermore, even when using the conventional technology that switches, for each country, on/off function for determining a country and automatically decreasing the SAR, it is difficult to absorb the differences of the DPC table for each information processing apparatus and thus it is difficult to reduce the complexity of the management. Furthermore, even when using the conventional technology that automatically changes the setting of the output properties on the basis of the prescribed items of the regulations accumulated in the server, it is also difficult to absorb the differences of the DPC table for each information processing apparatus and thus it is also difficult to reduce the complexity of the management.

According to an aspect of an embodiment of a wireless module, an information processing apparatus, and a computer-readable recording medium disclosed in the present invention, a storage unit stores therein control information that is used to limit the intensity of output radio waves of an own apparatus. When a wireless module is connected, a determination unit acquires identification information held by the wireless module and determines whether there is a match to identification information on the own apparatus. When the determination unit determines that there is no match, a communication control unit allows the wireless module to perform wireless communication by using the control information stored in the storage unit.

SUMMARY

According to an aspect of an embodiment, an information processing apparatus includes: a storage unit that stores therein control information which is used to limit the intensity of output radio waves of the information processing apparatus; a determination unit that acquires, when a wireless module is connected, specific identification information which is held by the wireless module and which is related to an specific information processing apparatus which is connected the last time and that determines whether there is a match to the identification information on the information processing apparatus; and a communication management unit that allows, when the determination unit determines that there is no match, the wireless module to perform wireless communication by using the control information stored in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram illustrating an example of a DPC table;

FIG. 7 is a flowchart illustrating the flow of a process of up to the startup of an OS performed by the information processing apparatus and the wireless module according to the second embodiment.

DESCRIPTION OF EMBODIMENTS

Preferred embodiments of the present invention will be explained with reference to accompanying drawings. The wireless module, the information processing apparatus, and the communication control program disclosed in the present invention are not limited to the embodiments described below.

[a] First Embodiment

Figure 1:
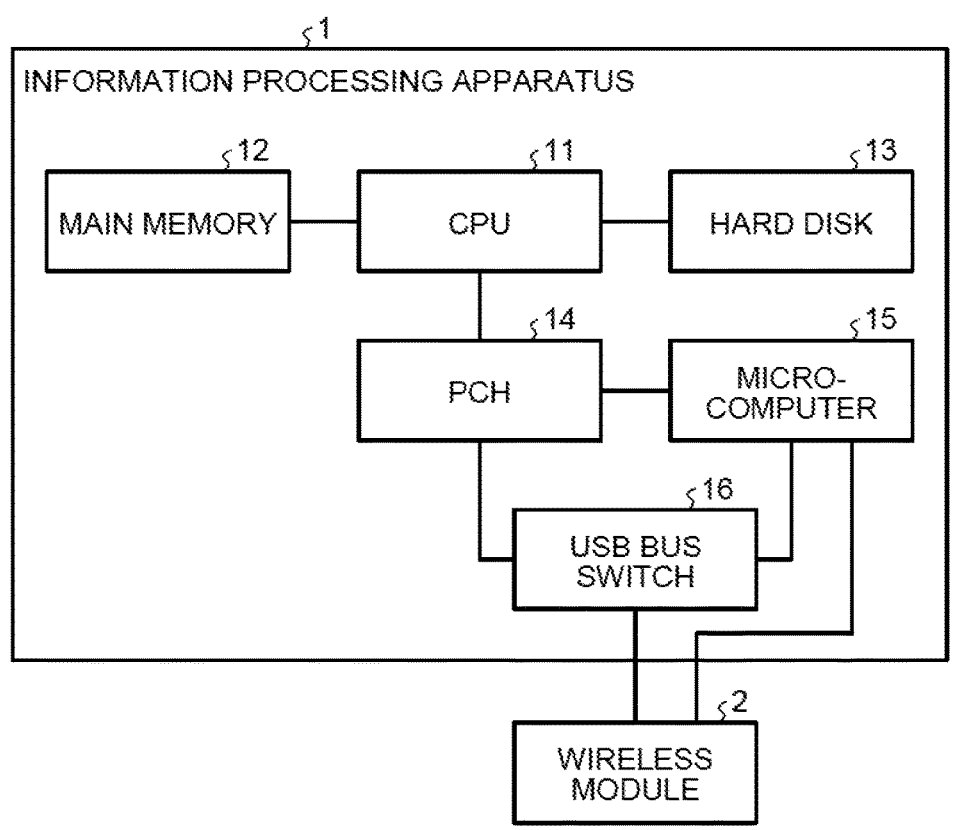
FIG. 1 is a schematic diagram illustrating the hardware configuration of an information processing apparatus.

FIG. 1 is a schematic diagram illustrating the hardware configuration of an information processing apparatus. As illustrated in FIG. 1, an information processing apparatus 1 includes a central processing unit (CPU) 11, a main memory 12, a hard disk 13, a platform control hub (PCH) 14, a microcomputer 15, and a universal serial bus (USB) bus switch 16.

The hard disk 13 is an auxiliary storage device of the information processing apparatus 1. The hard disk 13 stores therein various kinds of programs including an operating system (OS) and an application. Furthermore, the main memory 12 is a main storage device. Furthermore, on the motherboard having mounted thereon the CPU 11, a read only memory (ROM) (not illustrated) is mounted and a system management basic input output system (SMBIOS) is stored.

The CPU 11 is connected to the main memory 12 and the hard disk 13 by a bus. The CPU 11 reads and executes the SMBIOS from the ROM mounted on the motherboard. By executing the SMBIOS, the CPU 11 executes the initial setting of the hardware including the hard disk 13 and a wireless module 2. The information processing apparatus 1 according to the embodiment performs the setting of a DPC table of the wireless module 2 at the stage of the initial setting of the hardware performed by using the SMBIOS.

Then, the CPU 11 reads the OS from the hard disk 13 and starts up the OS by using the main memory 12. Furthermore, the CPU 11 reads various kinds of programs including an application from the hard disk 13, loads the programs into the main memory 12, and executes the programs.

Furthermore, the CPU 11 is connected to the PCH 14. The PCH 14 is a processor for peripheral devices. The PCH 14 performs management and control of the wireless module 2 and mediates communication between the CPU 11 and the wireless module 2 that is connected to the USB bus switch 16.

The microcomputer 15 is a computer independent of the CPU 11. The microcomputer 15 is connected to the PCH 14 and the USB bus switch 16 by the bus. Furthermore, the microcomputer 15 has a path directly connected to the wireless module 2 that receives a wake up signal from the wireless module 2. The microcomputer 15 performs, independently of the CPU 11, setting and control of a peripheral device, such as the wireless module 2, in which the initial setting has not been executed by the CPU 11.

The USB bus switch 16 has a path connected to the PCH 14 and the microcomputer 15. Furthermore, the USB bus switch 16 is connected to the wireless module 2. Then, the USB bus switch 16 switches the destination of the path connected to the wireless module 2 by selecting one of the PCH 14 and the microcomputer 15.

The wireless module 2 is connected to the PCH 14 or the microcomputer 15 via the USB bus switch 16 by being inserted to a USB port (not illustrated) that is included in the information processing apparatus 1. Furthermore, when the wireless module 2 is inserted into the USB port included in the information processing apparatus 1, the path that sends a wake up signal is directly connected to the microcomputer 15.

The wireless module 2 performs wireless communication, such as a wireless wide area network (WAN), or the like. Then, in response to the control from the PCH 14, the wireless module 2 sends and receives a signal to and from the CPU 11.

Figure 2:
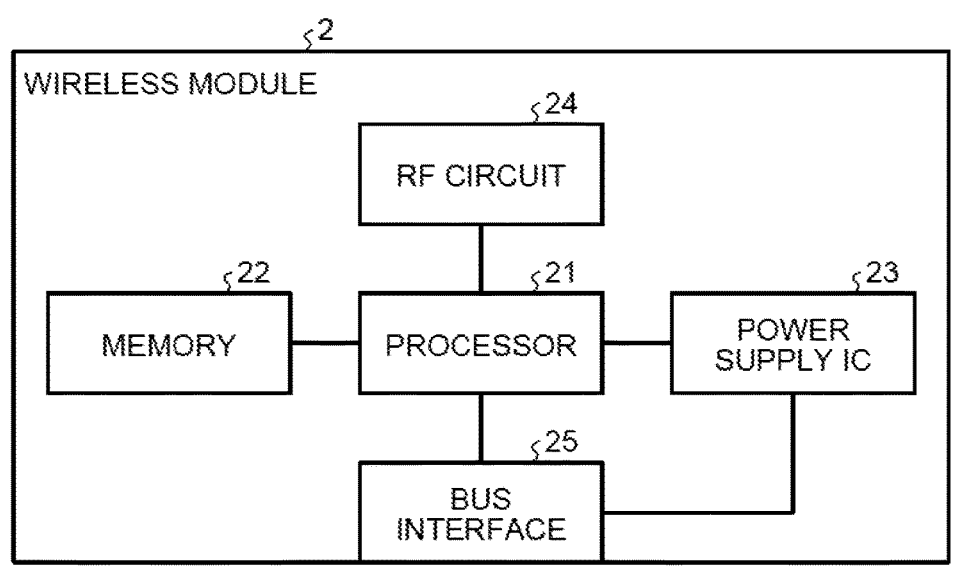
FIG. 2 is a schematic diagram illustrating the hardware configuration of a wireless module.

FIG. 2 is a schematic diagram illustrating the hardware configuration of a wireless module. The wireless module 2 includes a processor 21, a memory 22, a power supply IC 23, a radio frequency (RF) circuit 24, and a bus interface 25.

The bus interface 25 is an interface for communication performed by the processor 21 with the PCH 14 and the microcomputer 15 via the USB bus switch 16 illustrated in FIG. 1 in the state in which the wireless module 2 is connected to the USB port of the information processing apparatus 1. Furthermore, the bus interface 25 supplies, to the power supply IC 23, the power supply supplied from the power supply port of the USB port.

The power supply integrated circuit (IC) 23 has a reception power supply path between each of the units, such as the processor 21, the bus interface 25, and the like. Here, FIG. 2 illustrates the path extending to the processor 21 as the power supply path from the power supply IC 23; however, in practice, the power supply path also extends to the memory 22 and the RF circuit 24.

The power supply IC 23 receives a supply of the power supply supplied from the power supply port of the USB port via the bus interface 25. Then, the power supply IC 23 supplies the power supply to each of the units that use electrical power of the wireless module 2 including the processor 21, the memory 22, and the RF circuit 24.

The processor 21 is connected to the memory 22, the RF circuit 24, and the bus interface 25 by the bus. In response to the control from the PCH 14 and the microcomputer 15, the processor 21 executes a process of wireless communication by using the memory 22 and the RF circuit 24.

The RF circuit 24 is a circuit that performs wireless communication with an external device. The RF circuit 24 sends the signal acquired from the processor 21 to the external device. Furthermore, the RF circuit 24 sends the signal received from the external device to the processor 21.

Figure 3:
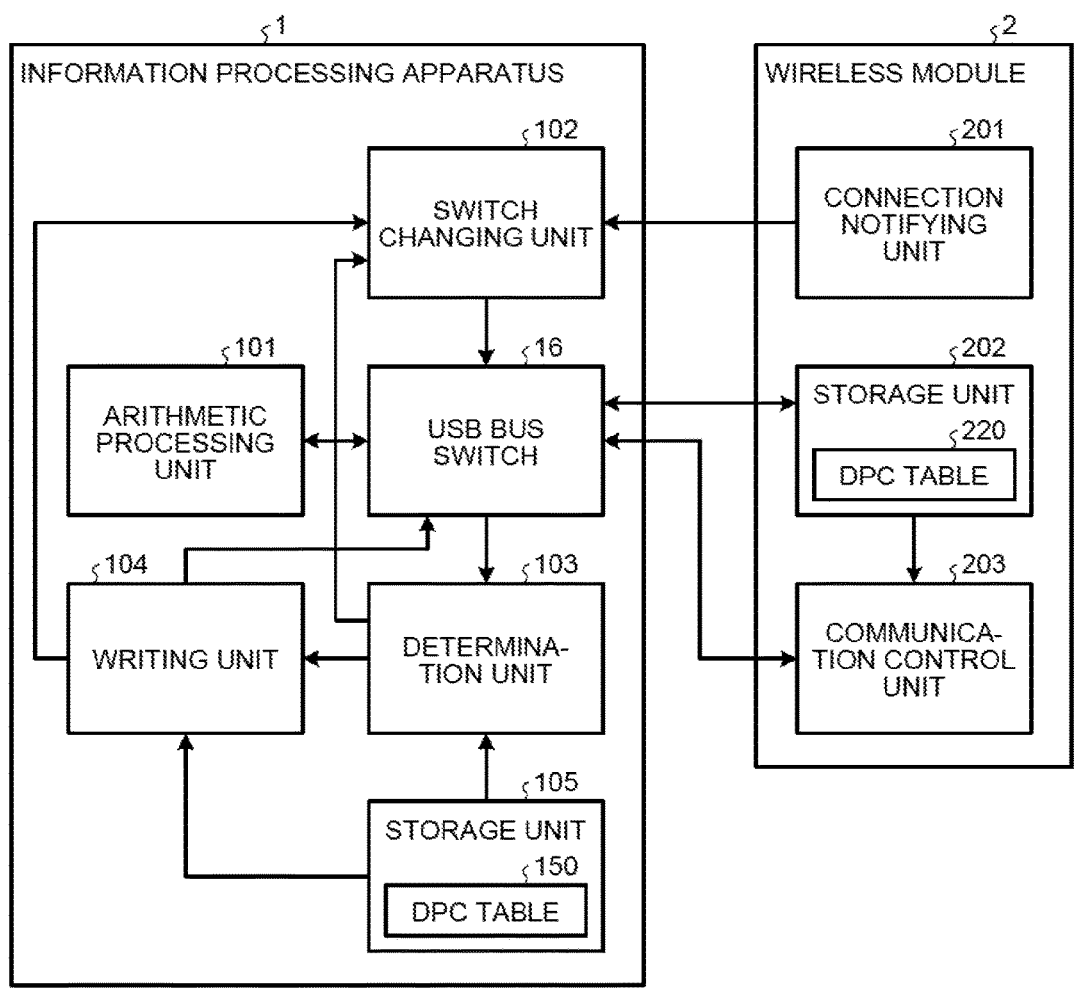
FIG. 3 is a block diagram illustrating the information processing apparatus and the wireless module according to a first embodiment.

In the following, communication performed by the information processing apparatus 1 and the wireless module 2 according to the embodiment by using the DPC table will be described in detail with reference to FIG. 3. FIG. 3 is a block diagram illustrating the information processing apparatus and the wireless module according to a first embodiment.

The information processing apparatus 1 includes the USB bus switch 16, an arithmetic processing unit 101, a switch changing unit 102, a determination unit 103, a writing unit 104, and a storage unit 105.

The arithmetic processing unit 101 is implemented by the CPU 11, the main memory 12, the hard disk 13, and the PCH 14 illustrated in FIG. 1. The arithmetic processing unit 101 sends an instruction to send and receive a signal to a communication control unit 203 in the wireless module 2 via the USB bus switch 16. Then, the arithmetic processing unit 101 sends and receives a signal to and from an external device by using the communication control unit 203.

The switch changing unit 102, the determination unit 103, the writing unit 104, and the storage unit 105 are implemented by the microcomputer 15 illustrated in FIG. 1.

The storage unit 105 is a memory built into the microcomputer 15. The storage unit 105 previously stores therein identification information for identifying the type of the information processing apparatus 1, for example, the device name of the information processing apparatus 1, or the like. Here, the identification information on the information processing apparatus may also be information that can identify the devices that have the same setting of decreasing the send output, i.e., the same DPC table, in order to conform to the SAR standard. Furthermore, the storage unit 105 previously stores therein a DPC table 150 in which set values that decrease the send output for each frequency are described in order for the information processing apparatus 1 to satisfy the SAR standard.

FIG. 4 is a schematic diagram illustrating an example of a DPC table. As illustrated in FIG. 4, for example, the DPC table 150 includes DPC set values for respective frequencies per communication mode. The DPC set value is a value indicating an amount of send output that is decreased. In this way, the DPC table 150 may also have, as a set value that decreases the send output for each frequency, a DPC set value for each frequency not only in a single communication mode but also in a plurality of the communication modes.

A description will be continued here by referring back to FIG. 3. When the wireless module 2 is connected to the USB port (not illustrated) that is included in the information processing apparatus 1, the switch changing unit 102 is connected to the path that receives a wake up signal and that directly connects the microcomputer 15 and the wireless module 2 illustrated in FIG. 1.

When the information processing apparatus 1 is started up, the switch changing unit 102 receives the wake up signal from a connection notifying unit 201 via the path that receives the wake up signal. Here, in FIG. 3, the switch changing unit 102 receives the wake up signal from the connection notifying unit 201; however, in practice, for example, the wake up signal is input by the following method. For example, a High voltage is always applied to the path that receives the wake up signal and that is connected to the microcomputer 15. Then, because the wireless module 2 is connected, the voltage is decreased and a Low voltage is input to the microcomputer 15. In response to the input of the Low voltage, the switch changing unit 102 determines that the wake up signal has been input.

When the switch changing unit 102 receives an input of the wake up signal, the switch changing unit 102 switches the path of the USB bus switch 16 to the path that connects the microcomputer 15 and the wireless module 2 illustrated in FIG. 1. Consequently, the microcomputer 15 becomes the state in which the microcomputer 15 can control the wireless module 2.

Then, the switch changing unit 102 receives an input of a return request for the path from the determination unit 103 or the writing unit 104. Then, the switch changing unit 102 switches the path of the USB bus switch 16 to the path that connects the PCH 14 and the wireless module 2 illustrated in FIG. 1. Consequently, the arithmetic processing unit 101 becomes the state in which the arithmetic processing unit 101 can perform communication with an external device by using the wireless module 2.

When the USB bus switch 16 is switched by the switch changing unit 102 such that the wireless module 2 is connected to the microcomputer 15, the determination unit 103 acquires the identification information held by a storage unit 202 in the wireless module 2. The identification information held by the storage unit 202 is the identification information on the information processing apparatus to which the wireless module 2 is connected the last time. Furthermore, if the wireless module 2 is not connected to the information processing apparatus before, the storage unit 202 does not have the identification information. In this case, the determination unit 103 acquires a blank, i.e., no information, from the storage unit 202.

Then, the determination unit 103 determines whether the identification information acquired from the storage unit 202 is a blank. If the identification information is a blank, the determination unit 103 determines that the DPC table 150 associated with the information processing apparatus 1 is not stored in the storage unit 202. Then, the determination unit 103 instructs the writing unit 104 to write the DPC table 150 and the identification information on the information processing apparatus 1.

In contrast, if the identification information is not a blank, the determination unit 103 acquires the identification information on the information processing apparatus 1 stored in the storage unit 105. Then, the determination unit 103 compares the identification information acquired from the storage unit 202 in the wireless module 2 with the identification information on the information processing apparatus 1. If both the pieces of the identification information match, the determination unit 103 determines that a DPC table 220 stored in the storage unit 202 in the wireless module 2 has the same content as that stored in the DPC table 150 associated with the information processing apparatus 1. Then, the determination unit 103 outputs the return request for the path to the switch changing unit 102.

In contrast, if both the pieces of the identification information do not match, the determination unit 103 determines that the DPC table 220 stored in the storage unit 202 has the content different from that stored in the DPC table 150 associated with the information processing apparatus 1. Then, the determination unit 103 instructs the writing unit 104 to write the DPC table 150 and the identification information on the information processing apparatus 1.

The writing unit 104 receives an instruction to write the DPC table 150 and the identification information on the information processing apparatus 1 from the determination unit 103. The writing unit 104 acquires the DPC table 150 in the information processing apparatus 1 from the storage unit 105. Then, the writing unit 104 rewrites the content of the DPC table 220 stored by the storage unit 202 in the wireless module 2 to the content of the DPC table 150 via the USB bus switch 16.

Furthermore, the writing unit 104 acquires the identification information on the information processing apparatus 1 from the storage unit 105. Then, the writing unit 104 rewrites the identification information stored in the storage unit 202 in the wireless module 2 to the identification information on the information processing apparatus 1 via the USB bus switch 16. Thereafter, the writing unit 104 outputs the return request for the path to the switch changing unit 102.

In the following, the wireless module 2 will be described. The wireless module 2 includes, as illustrated in FIG. 3, the connection notifying unit 201, the storage unit 202, and the communication control unit 203.

The storage unit 202 is implemented by the memory 22 illustrated in FIG. 2. When the storage unit 202 is connected to, as described above, the information processing apparatus 1, the content held by the DPC table 220 is rewritten to the content of the DPC table 150 associated with the information processing apparatus 1. Furthermore, when the storage unit 202 is connected to the information processing apparatus 1, the content held by the DPC table 220 is rewritten to the identification information on the information processing apparatus 1. Namely, the storage unit 202 stores therein the identification information on the information processing apparatus connected the last time and stores therein the DPC table 220 associated with the information processing apparatus connected the last time. The DPC table 220 stored in the storage unit 202 also has the same configuration as that of, for example, the DPC table illustrated in FIG. 4.

The storage unit 202 receives an acquisition request for the identification information from the determination unit 103 via the USB bus switch 16. Then, the storage unit 202 sends, to the determination unit 103 via the USB bus switch 16, the identification information that is stored in the storage unit 202 and that is related to the information processing apparatus connected the last time.

Furthermore, the storage unit 202 receives, from the writing unit 104 via the USB bus switch 16, an instruction to update the DPC table 220 to the content of the DPC table 150. Then, the storage unit 202 rewrites and updates the content of the DPC table 220 stored in the storage unit 202 to the content of the DPC table 150. Furthermore, the storage unit 202 receives an instruction to update the identification information from the writing unit 104 via the USB bus switch 16. Then, the storage unit 202 rewrites and updates the identification information stored in the storage unit 202 to the identification information on the information processing apparatus 1.

When the wireless module 2 is connected to the USB port included in the information processing apparatus 1, the connection notifying unit 201 is connected to the path that sends the wake up signal and that directly connects the microcomputer 15 and the wireless module 2 illustrated in FIG. 1.

When the information processing apparatus 1 to which the wireless module 2 is connected is started up, the connection notifying unit 201 sends the wake up signal to the switch changing unit 102 via the path that sends the wake up signal. Here, for example, by inputting a Low voltage to the path that sends the wake up signal and that is connected to the microcomputer 15, when the wake up signal is input, the connection notifying unit 201 may also simply be the path that is connected to the ground.

The communication control unit 203 is implemented by the processor 21 and the RF circuit 24 illustrated in FIG. 2. The communication control unit 203 sends the signal received from the arithmetic processing unit 101 via the USB bus switch 16 to an external device by using wireless communication. Furthermore, the communication control unit 203 outputs the signal received from the external device to the arithmetic processing unit 101 via the USB bus switch 16.

Furthermore, when a person approaches the information processing apparatus 1 having mounted thereon the wireless module 2, the communication control unit 203 acquires, from the DPC table 220 stored in the storage unit 202, the DPC set value associated with the communication mode and the frequency that are to be used. Then, the communication control unit 203 decreases the send output by using the acquired DPC set value. Here, in the embodiment, the send output is decreased when a person approaches; however, in contrast, the send output may also be normally decreased and, if no person is present at the time of transmission, the send output may also be increased. Furthermore, both the information processing apparatus 1 and the wireless module 2 preferably have mounted thereon a proximity sensor or the like that detects the proximity of a person.

Figure 5:
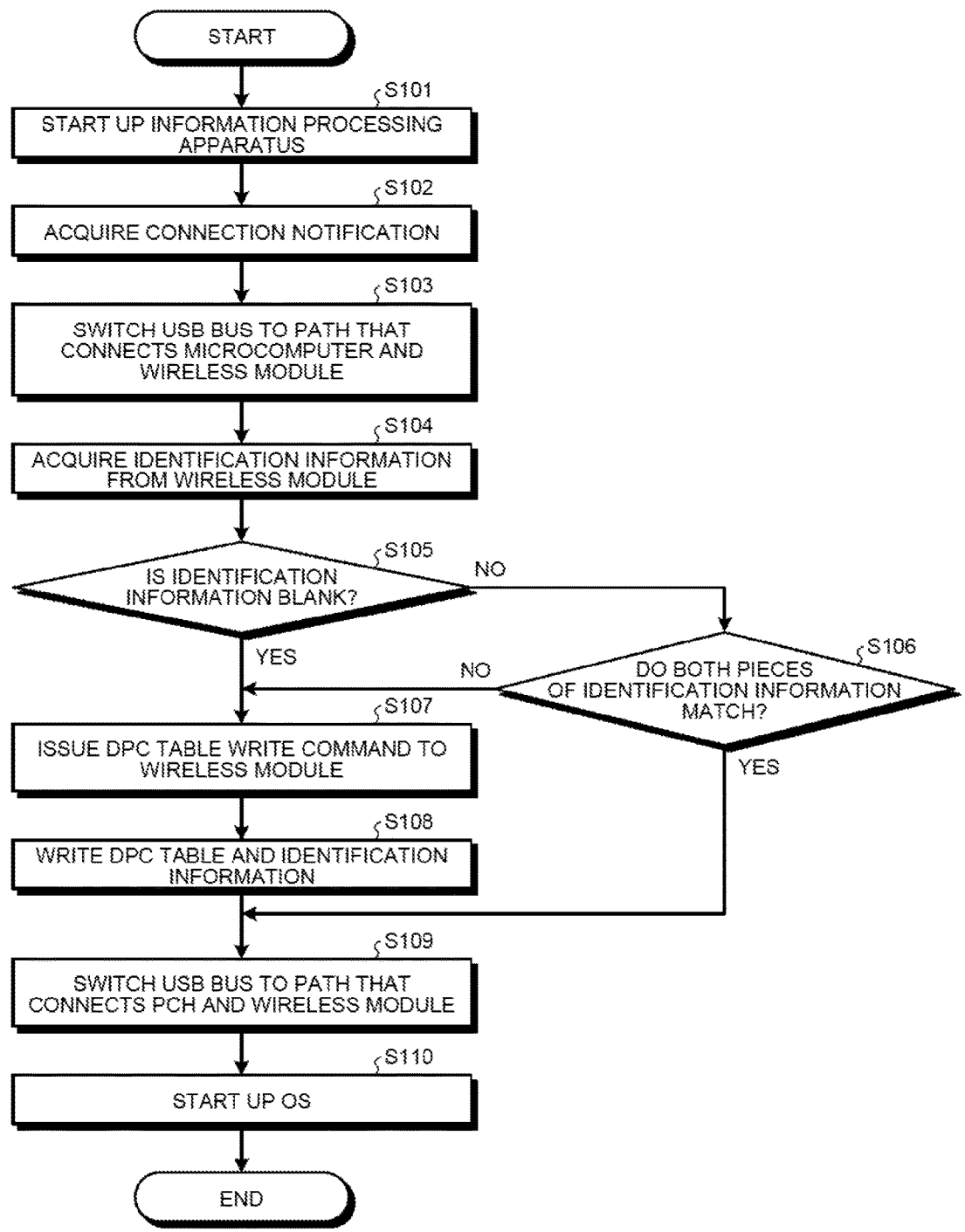
FIG. 5 is a flowchart illustrating the flow of a process of up to the startup of an OS performed by the information processing apparatus and the wireless module according to the first embodiment.

In the following, the flow of a process of up to the startup of an OS performed by the information processing apparatus 1 and the wireless module 2 according to the embodiment will be described with reference to FIG. 5. FIG. 5 is a flowchart illustrating the flow of a process of up to the startup of the OS performed by the information processing apparatus and the wireless module according to the first embodiment.

The power supply of the information processing apparatus 1 is turned on by an operator and the arithmetic processing unit 101 in the information processing apparatus 1 starts the startup (Step S101).

The switch changing unit 102 receives a connection notification from the connection notifying unit 201 (Step S102).

The switch changing unit 102 switches the USB bus switch 16 such that the path of the USB bus becomes the path that connects the microcomputer 15 and the wireless module 2 (Step S103).

The determination unit 103 acquires the identification information from the storage unit 202 in the wireless module 2 via the USB bus switch 16 (Step S104).

The determination unit 103 determines whether the acquired identification information is a blank (Step S105). If the identification information is not a blank (No at Step S105), the determination unit 103 acquires the identification information on the information processing apparatus 1 from the storage unit 105. Then, the determination unit 103 determines whether the identification information acquired from the storage unit 202 in the wireless module 2 matches the identification information on the information processing apparatus 1 (Step S106).

If both the pieces of the identification information match (Yes at Step S106), the determination unit 103 proceeds to Step S109. In contrast, if the identification information is a blank (Yes at Step S105) or both the pieces of the identification information do not match (No at Step S106), the determination unit 103 instructs the writing unit 104 to write the DPC table 150 and the identification information on the information processing apparatus 1. The writing unit 104 acquires the instruction to write the DPC table 150 and the identification information on the information processing apparatus 1 from the determination unit 103. Then, the writing unit 104 issues a DPC table write command to the wireless module 2 (Step S107).

The storage unit 202 receives the DPC table write command and updates the content of the DPC table 220 stored in the storage unit 202 to the content of the DPC table 150. Furthermore, the storage unit 202 updates the identification information stored in the storage unit 202 to the identification information on the information processing apparatus 1 (Step S108).

The determination unit 103 or the writing unit 104 outputs the return request for the USB bus to the switch changing unit 102. The switch changing unit 102 receives an input of the return request for the USB bus from the determination unit 103 or the writing unit 104. Then, the switch changing unit 102 switches the USB bus switch 16 such that the path of the USB bus becomes the path that connects the PCH 14 and the wireless module 2 (Step S109).

Thereafter, the arithmetic processing unit 101 starts up the OS (Step S110).

As described above, with the information processing apparatus according to the embodiment, if the DPC table held by the connected wireless module is not the DPC table that is associated with the own apparatus, the information processing apparatus automatically rewrites the DPC table held by the wireless module to the DPC table associated with the own apparatus. Consequently, the wireless module automatically has the DPC table that is associated with the connected information processing apparatus. Thus, it is possible to conform to the wireless communication standard, in particular, conform to the Body-SAR standard while reducing the complexity of the management.

[b] Second Embodiment

Figure 6:
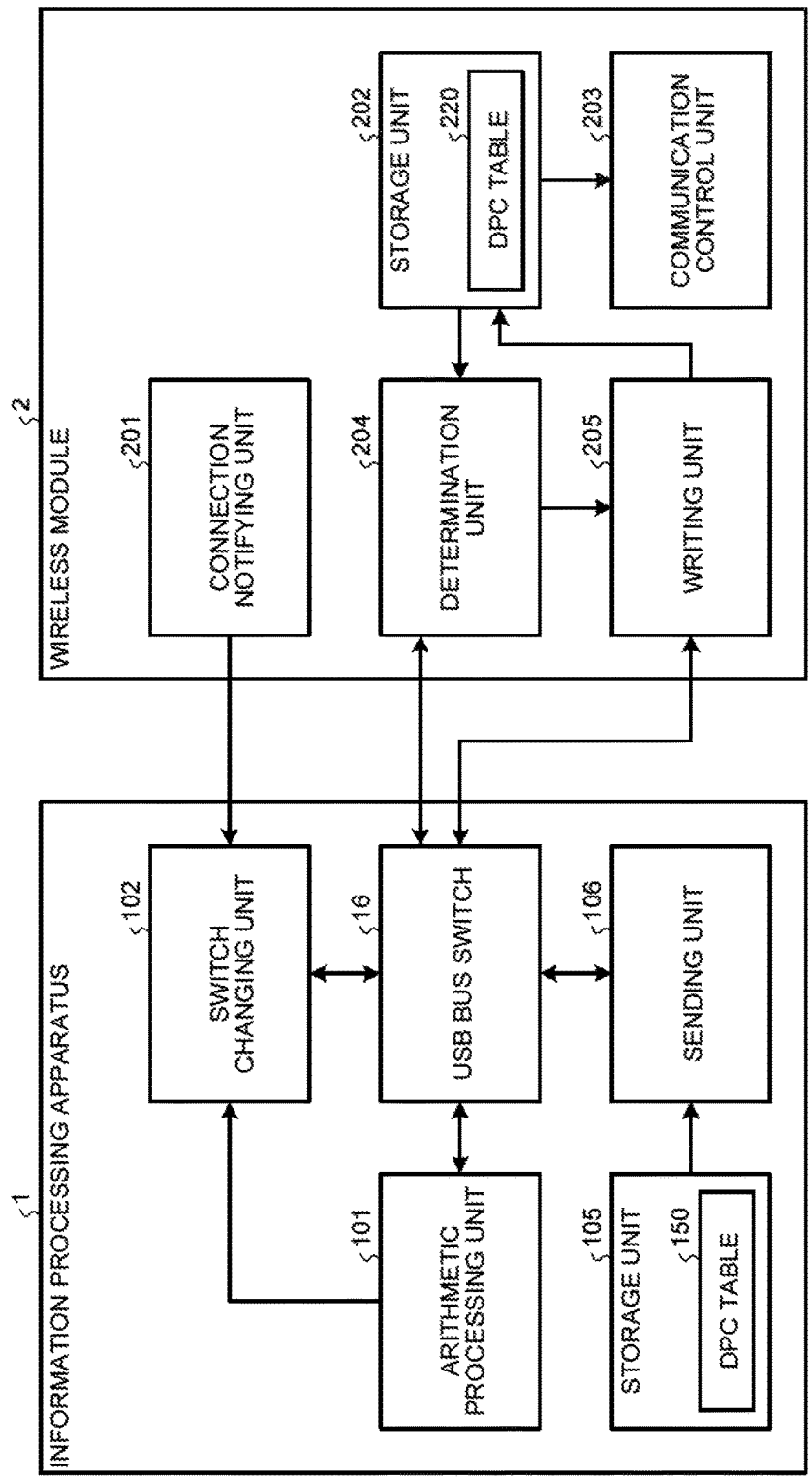
FIG. 6 is a block diagram illustrating an information processing apparatus and a wireless module according to a second embodiment.

FIG. 6 is a block diagram illustrating an information processing apparatus and a wireless module according to a second embodiment. The wireless module 2 according to the second embodiment differs from the first embodiment in that, instead of the microcomputer 15 in the information processing apparatus 1, the wireless module 2 itself takes the lead and manages the DPC table 220. In the following, the information processing apparatus 1 and the wireless module 2 according to the second embodiment will be described with reference to FIG. 6. However, in the following, a description of each of the units having the same function as that described in the first embodiment will be omitted.

The wireless module 2 according to the second embodiment includes the connection notifying unit 201, the storage unit 202, the communication control unit 203, a determination unit 204, and a writing unit 205. The determination unit 204 and the writing unit 205 are implemented by the CPU 11 illustrated in FIG. 1. Specifically, various kinds of programs including the program that implements the function described below are stored in the memory 22, the processor 21 reads various kinds of programs from the memory 22 and executes the programs, whereby the CPU 11 implements the determination unit 204 and the writing unit 205.

When the information processing apparatus 1 is started up, the determination unit 204 acquires, from the storage unit 202, the identification information on the information processing apparatus connected the last time. Then, the determination unit 204 determines whether the identification information is a blank. If the identification information is a blank, the determination unit 204 determines that the DPC table 220 stored in the storage unit 202 is not associated with the information processing apparatus 1. Then, the determination unit 204 instructs the writing unit 205 to update the DPC table 220 and the identification information. At this time, the determination unit 204 outputs the identification information on the information processing apparatus 1 to the writing unit 205.

In contrast, if the identification information is not a blank, the determination unit 204 sends the acquisition request for the identification information to a sending unit 106 via the USB bus switch 16. Then, the determination unit 204 acquires the identification information on the information processing apparatus 1 from the sending unit 106 via the USB bus switch 16. Then, the determination unit 204 compares the identification information on the information processing apparatus 1 with the identification information on the information processing apparatus connected the last time. If both the pieces of the identification information match, the determination unit 204 determines that the DPC table 220 stored in the storage unit 202 is associated with the information processing apparatus 1. Then, the determination unit 204 sends the return request for the path to the switch changing unit 102 via the USB bus switch 16.

In contrast, if both the pieces of the identification information do not match, the determination unit 204 determines that the DPC table 220 stored in the storage unit 202 is not associated with the information processing apparatus 1. Then, the determination unit 204 instructs the writing unit 205 to update the DPC table 220 and the identification information. At this time, the determination unit 204 outputs the identification information on the information processing apparatus 1 to the writing unit 205.

The writing unit 205 receives, from the determination unit 204, the instruction to update the DPC table 220 and the identification information. At this time, the writing unit 205 receives, from the determination unit 204, an input of the identification information on the information processing apparatus 1. Then, the writing unit 205 sends the acquisition request for the DPC table 150 to the sending unit 106 via the USB bus switch 16.

Thereafter, the writing unit 205 receives the DPC table 150 from the sending unit 106 via the USB bus switch 16. Then, the writing unit 205 rewrites and updates the DPC table 220 stored in the storage unit 202 to the content of the DPC table 150. Furthermore, the writing unit 205 rewrites and updates the identification information stored in the storage unit 202 to the identification information on the information processing apparatus 1. Thereafter, the writing unit 205 sends the return request for the path to the switch changing unit 102 via the USB bus switch 16.

In the following, the information processing apparatus 1 will be described. The information processing apparatus 1 includes the USB bus switch 16, the arithmetic processing unit 101, the switch changing unit 102, the storage unit 105, and a sending unit 106.

The sending unit 106 receives an acquisition request for the identification information from the determination unit 204 via the USB bus switch 16. Then, the sending unit 106 acquires the identification information on the information processing apparatus 1 from the storage unit 105. Then, the sending unit 106 sends the identification information on the information processing apparatus 1 to the determination unit 204 via the USB bus switch 16.

Furthermore, the sending unit 106 acquires an acquisition request for the DPC table 150 from the writing unit 205 via the USB bus switch 16. Then, the sending unit 106 acquires the DPC table 150 from the storage unit 105. Then, the sending unit 106 sends the DPC table 150 to the writing unit 205 via the USB bus switch 16.

When the power supply of the information processing apparatus 1 is turned on and a startup is started and then the switch changing unit 102 receives a wake up signal from the connection notifying unit 201, the switch changing unit 102 switches the path of the USB bus switch 16 to the path that connects the microcomputer 15 and the wireless module 2 illustrated in FIG. 1. Then, the switch changing unit 102 receives the return request for the path from the determination unit 204 or the writing unit 205 via the USB bus switch 16. Then, the switch changing unit 102 switches the path of the USB bus switch 16 to the path that connects the PCH 14 and the wireless module 2 illustrated in FIG. 1.

In the following, the flow of the process of up to the startup of the OS performed by the information processing apparatus 1 and the wireless module 2 according to the second embodiment will be described with reference to FIG. 7. FIG. 7 is a flowchart illustrating the flow of a process of up to the startup of the OS performed by the information processing apparatus and the wireless module according to the second embodiment.

The power supply of the information processing apparatus 1 is turned on by an operator and the arithmetic processing unit 101 in the information processing apparatus 1 starts the startup (Step S201).

The switch changing unit 102 receives a connection notification from the connection notifying unit 201 (Step S202).

The switch changing unit 102 switches the USB bus switch 16 such that the path of the USB bus becomes the path that connects the microcomputer 15 and the wireless module 2 (Step S203).

The determination unit 204 in the wireless module 2 acquires the identification information on the information processing apparatus connected the last time from the storage unit 202 (Step S204).

The determination unit 204 determines whether the acquired identification information is a blank (Step S205). If the identification information is a blank (Yes at Step S205), the determination unit 204 proceeds to Step S207.

In contrast, if the identification information is not a blank (No at Step S205), the determination unit 204 acquires the identification information on the information processing apparatus 1 from the sending unit 106 in the information processing apparatus 1 via the USB bus switch 16 (Step S206).

Then, the determination unit 204 determines whether the identification information on the information processing apparatus connected the last time does not match the identification information on the information processing apparatus 1 (Step S207).

If both the pieces of the identification information match (Yes at Step S207), the determination unit 204 proceeds to Step S210.

In contrast, if the identification information is a blank (Yes at Step S205) or both the pieces of the identification information do not match (No at Step S207), the determination unit 204 instructs the writing unit 205 to update the DPC table 150 and the identification information on the information processing apparatus 1. The writing unit 205 acquires the instruction to update the DPC table 150 and the identification information on the information processing apparatus 1 from the determination unit 204. Then, the writing unit 205 acquires the DPC table 150 from the sending unit 106 via the USB bus switch 16. Thereafter, the writing unit 205 writes and updates the information stored in the DCP table 150 into the DCP table 220 stored in the storage unit 202 (Step S208).

Furthermore, The writing unit 205 deletes the identification information stored in the storage unit 202 and writes the identification information on the information processing apparatus 1 (Step S209).

The determination unit 204 or the writing unit 205 outputs the return request for the USB bus to the switch changing unit 102 via the USB bus switch 16. The switch changing unit 102 receives an input of the return request for the USB bus from the determination unit 204 or the writing unit 205 via the USB bus switch 16. Then, the switch changing unit 102 switches the USB bus switch 16 such that the path of the USB bus becomes the path that connects the PCH 14 and the wireless module 2 (Step S210).

Thereafter, the arithmetic processing unit 101 starts up the OS (Step S211).

As described above, with the wireless module according to the embodiment, if the DPC table included in the wireless module is not associated with the information processing apparatus, the wireless module according takes the lead and rewrites the DPC table stored in the wireless module to the DPC table that is associated with the information processing apparatus to which the DPC table stored in the wireless module is connected. Consequently, as described in the second embodiment, even when the management of the DPC table is performed on the wireless module side, the wireless module automatically has the DPC table associated with the connected information processing apparatus. Thus, it is possible to conform to the wireless communication standard, in particular, conform to the Body-SAR standard while reducing the complexity of the management.

Furthermore, in the above description, a description has been given of a case in which the storage unit 105 in the information processing apparatus 1 previously has identification information on the information processing apparatus; however, the embodiment is not limited to this and, for example, it may also be possible to use the configuration in which the SMBIOS operated by the CPU 11 at the time of a started up sends the identification information on the information processing apparatus to the wireless module.

According to an aspect of an embodiment of the wireless module, the information processing apparatus, and the communication control program disclosed in the present invention, an advantage is provided in that it is possible to conform to the wireless communication standard while reducing the complexity of the management.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a processor and a memory, wherein
the memory stores therein a table in which a plurality of set values that decrease an intensity of output radio waves of the information processing apparatus for each frequency are described; and
the processor includes
a determination unit that acquires, when a wireless module is connected, specific identification information which is held by the wireless module and which is related to a specific information processing apparatus which is connected a last time and that determines whether there is a match to the identification information on the information processing apparatus; and
a communication management unit that allows, when the determination unit determines that there is no match, the wireless module to determine the intensity of output radio waves for each frequency based on the set value in the table and to perform wireless communication by using the set values in the table stored in the memory.

2. The information processing apparatus according to claim 1, wherein, when the determination unit determines that the specific identification information which is held by the wireless module and which is related to the specific information processing apparatus which is connected the last time does not match the identification information on the information processing apparatus, the communication management unit allows the wireless module to store the identification information on the information processing apparatus.

3. The information processing apparatus according to claim 1, wherein, when the wireless module does not hold the specific identification information on the specific information processing apparatus which is connected the last time, the determination unit determines that there is no match to the identification information on the information processing apparatus.

4. A wireless module comprising:
a processor and a memory, wherein
the memory that stores therein a table in which a plurality of set values that decrease an intensity of output radio waves of a first information processing apparatus connected a last time for each frequency are described and first identification information on the first information processing apparatus connected the last time; and
the processor includes
a determination unit that acquires a second identification information on a second information processing apparatus connected this time and that determines whether there is a match to the second identification information and the first identification information;
an information management unit that acquires, when the determination unit determines that there is no match, a plurality of second set values that decrease an intensity of the output radio waves from the second information processing apparatus connected this time; and
a wireless communication unit that performs wireless communication by using the second set values acquired by the information management unit.

5. The wireless module according to claim 4, wherein when the determination unit determines that the second identification information does not match the first identification information, the information management unit acquires the set values on the send output from the second information processing apparatus connected this time and updates the set values stored in the memory to the acquired set values, and
the wireless communication unit performs wireless communication by using the set values stored in the memory.

6. The wireless module according to claim 4, wherein the information management unit updates the first identification information stored in the memory to the second identification information on the second information processing apparatus connected this time.

7. The wireless module according to claim 4, wherein, when the memory does not hold the first identification information on the first information processing apparatus connected the last time, the determination unit determines that there is no match to the second identification information on the second information processing apparatus connected this time.

8. A non-transitory computer-readable recording medium having stored therein a communication control program that causes an information processing apparatus to execute a process comprising:
acquiring, when a wireless module is connected to the information processing apparatus, specific identification information which is held by the wireless module and which is related to a specific information processing apparatus which is connected a last time;
determining whether the specific identification information on the specific information processing apparatus connected the last time matches the identification information on the information processing apparatus; and
allowing, when it is determined that there is no match, the wireless module to perform wireless communication by using a table in which a plurality of set values that decrease an intensity of output radio waves for each frequency are described and which is stored in a memory.

9. A non-transitory computer-readable recording medium having stored therein a communication control program that causes a wireless module to execute a process comprising:
storing, in a memory, a table in which a plurality of set values that decrease an intensity of output radio waves of a first information processing apparatus which is connected a last time for each frequency are described and first identification information on the first information processing apparatus connected the last time;
acquiring a second identification information on a second information processing apparatus connected this time;
determining whether the first identification information on the first information processing apparatus connected the last time stored in the memory matches the second identification information on the second information processing apparatus connected this time;

acquiring, when it is determined that there is no match, a plurality of second set values that decrease an intensity of the output radio waves of the second information processing apparatus connected this time from the second information processing apparatus connected this time; and performing wireless communication by using the acquired second set values.

\* \* \* \* \*